(12) United States Patent
Dusina et al.

(10) Patent No.: US 10,676,071 B2
(45) Date of Patent: Jun. 9, 2020

(54) SYSTEM AND METHOD FOR AUTOMATED CLEANING OF A SENSOR LENS

(71) Applicant: GM GLOBAL TECHNOLOGY OPERATIONS LLC, Detroit, MI (US)

(72) Inventors: Frank J. Dusina, White Lake, MI (US); Scott W. Damman, White Lake, MI (US); Aaron S. Pfau, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 15/585,264

(22) Filed: May 3, 2017

(65) Prior Publication Data

US 2018/0319376 A1 Nov. 8, 2018

(51) Int. Cl.
*B60S 1/56* (2006.01)
*G02B 27/00* (2006.01)
(52) U.S. Cl.
CPC ............ *B60S 1/56* (2013.01); *G02B 27/0006* (2013.01)
(58) Field of Classification Search
CPC .......... B60S 1/56; B60S 1/60; G02B 27/0006; B60R 16/023; B60R 1/001
See application file for complete search history.

(56) References Cited

U.S. PATENT DOCUMENTS

| 2015/0177512 | A1* | 6/2015 | Hayakawa | ................ B60S 1/56 348/148 |
| 2018/0012350 | A1* | 1/2018 | Gangitano | ......... H04N 5/23203 |
| 2018/0143298 | A1* | 5/2018 | Newman | ............... G01S 13/862 |
| 2018/0272958 | A1* | 9/2018 | Brouwer | ................ B60R 11/04 |

* cited by examiner

*Primary Examiner* — Nga X Nguyen
(74) *Attorney, Agent, or Firm* — Quinn IP Law (57) ABSTRACT

Methods and system for monitoring and evaluating irregularities on a sensor lens of a vehicle sensor are disclosed. One embodiment of a method includes the steps of providing the vehicle with an actuator configured to move the sensor lens and a controller in electronic communication with the actuator, receiving sensor data corresponding to at least one characteristic of a vehicle environment from the at least one sensor, evaluating the sensor data to determine if the sensor data indicates an irregularity on the sensor lens of the at least one sensor, classifying the irregularity, storing irregularity data corresponding to the classified irregularity in a non-transient, computer-readable data medium, and, in response to the classified irregularity, automatically controlling the actuator to move the sensor lens from a first position to a second position.

5 Claims, 7 Drawing Sheets

SYSTEM AND METHOD FOR AUTOMATED CLEANING OF A SENSOR LENS

The present invention relates generally to the field of vehicle sensors and, more specifically, to a movable lens and cleaning system for a vehicle sensor.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous vehicles are equipped with a variety of sensors to provide information on the surrounding environment. Sensors commonly found on autonomous vehicles include LIDAR sensors, RADAR, and optical cameras. During operation, debris or damage can occur to the lens of the sensor. The damage or debris can compromise the field of view of the sensor and thus compromise performance of the autonomous driving system.

SUMMARY

Embodiments according to the present disclosure provide a number of advantages. For example, embodiments according to the present disclosure mitigate the effect of damage to or debris on a lens of a vehicle sensor, such as, for example and without limitation, a LIDAR sensor or optical camera. Additionally, embodiments according to the present disclosure include a sensor lens positioned at least partially in a field of view of the sensor. The sensor lens is movable from a first position to a second position such that in the first position a first area of the sensor lens is positioned in the field of view of the sensor and in the second position a second area of the sensor lens is positioned in the field of view of the sensor. As the sensor moves from the first position to the second position, a lens cleaning system cleans the sensor lens to remove debris.

In one aspect, a method to monitor and evaluate irregularities on a sensor lens of at least one sensor of a vehicle is disclosed. The method includes the steps of providing the vehicle with an actuator configured to move the sensor lens and a controller in electronic communication with the actuator, receiving, by the controller, sensor data corresponding to at least one characteristic of a vehicle environment from the at least one sensor, evaluating, by the controller, the sensor data to determine if the sensor data indicates an irregularity on the sensor lens of the at least one sensor, classifying, by the controller, the irregularity, storing, by the controller, irregularity data corresponding to the classified irregularity in a non-transient, computer-readable data medium, and in response to the classified irregularity, automatically controlling, by the controller, the actuator to move the sensor lens from a first position to a second position.

In some aspects, classifying the irregularity includes classifying the irregularity as either debris on the sensor lens or damage to the sensor lens.

In some aspects, classifying the irregularity includes classifying the irregularity as one of removable debris, ignorable debris, serviceable damage, and ignorable damage.

In some aspects, in response to classifying the irregularity as ignorable debris, the method further includes removing, from the non-transient, computer readable medium, stored sensor data obtained when the sensor lens was in the first position, wherein in the first position a field of view of the sensor lens is at least partially obscured by the irregularity.

In some aspects, in response to classifying the irregularity as ignorable damage, the method further includes automatically controlling, by the controller, the actuator to move the sensor lens from a first position in which the irregularity appears in a field of view of the sensor to a second position in which the irregularity does not appear in the field of view of the sensor.

In some aspects, the method further includes providing the vehicle with a cleaning system including a lens cleaner configured to clean at least a portion of an outside surface of the sensor lens, and in response to classifying the irregularity as removable debris, automatically controlling, by the controller, the actuator to move the sensor lens from a first position to a second position wherein the lens cleaner moves across at least a portion of the outside surface of the sensor lens to remove the debris from the sensor lens.

In some aspects, the method further includes providing the vehicle with a wireless communication system, and in response to classifying the irregularity as serviceable damage, generating, by the controller, a notification signal and transmitting via the wireless communication system, the notification signal to a remote access center, wherein the notification signal is a service notification for the at least one sensor.

In some aspects, storing the irregularity data includes storing a location of the irregularity on the sensor lens.

In another aspect, an automotive vehicle includes at least one vehicle sensor including a sensor lens, at least one sensor lens cleaning system configured to clean at least a portion of a surface of the sensor lens, at least one actuator configured to control the at least one sensor lens, and a controller programmed with a sensor lens cleaning and evaluation control system algorithm and configured to communicate an actuator control signal based on the sensor lens cleaning and evaluation control system algorithm.

In some aspects, the at least one sensor lens cleaning system includes a cleaner body and a tip, wherein the tip extends along at least a portion of an outer surface of the at least one sensor lens from one end of the sensor lens to an opposite end of the sensor lens.

In some aspects, the sensor lens fully encircles the vehicle sensor.

In some aspects, the sensor lens is rotatable about an axis passing through the vehicle sensor.

In some aspects, pressure of the tip against the sensor lens removes an irregularity from the outer surface of the sensor lens as the sensor lens rotates.

In some aspects, the sensor lens translates in front of at least a portion of the vehicle sensor.

In some aspects, pressure of the tip against the sensor lens removes an irregularity from the outer surface of the sensor lens as the sensor lens translates.

In yet another aspect, a sensor lens assembly of a vehicle sensor includes a sensor lens configured to at least partially extend across a field of view of the vehicle sensor, at least one actuator configured to control the sensor lens, a cleaner body, and a tip connected to the cleaner body, the tip extending from one end of the sensor lens to an opposite end of the sensor lens. In response to an actuator control signal received by the at least one actuator, the sensor lens moves relative to the vehicle sensor such that a first area of the sensor lens is displaced from the field of view of the vehicle sensor and a second area of the sensor lens extends across the field of view of the vehicle sensor.

In some aspects, the at least one actuator is a rotational cylinder that rotates in a first direction such that the sensor lens moves in a second and opposite direction.

In some aspects, the sensor lens fully encircles the vehicle sensor.

In some aspects, the sensor lens is rotatable about an axis passing through the vehicle sensor.

In some aspects, the sensor lens translates in front of at least a portion of the vehicle sensor in response to the rotation of the at least one actuator and pressure of the tip against the sensor lens removes an irregularity from the outer surface of the sensor lens as the sensor lens translates.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
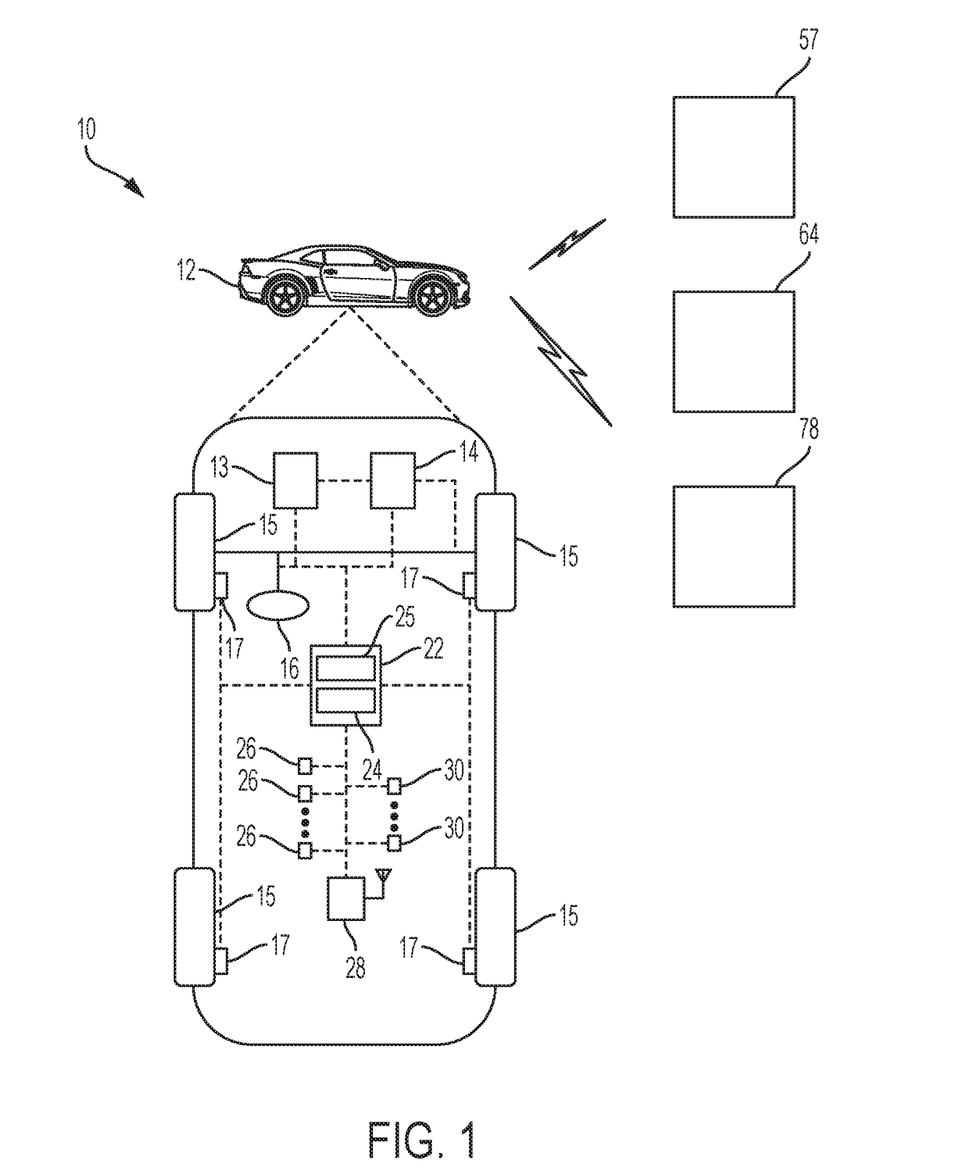
FIG. 1 is a schematic diagram of a communication system including a sensor-equipped vehicle, according to an embodiment.

FIG. 1 schematically illustrates an operating environment that comprises a mobile vehicle communication and control system 10 for a motor vehicle 12. The communication and control system 10 for the vehicle 12 generally includes a networked wireless device 57 including but not limited to a smart phone, tablet, or wearable device such as a watch, a computer 64, and a remote access center 78.

As discussed herein, the vehicle 12 includes a variety of sensors 26 that provide information to assist with control of the vehicle 12. The sensors 26 include, in some embodiments, one or more GPS, RADAR, LIDAR, optical cameras, thermal cameras, ultrasonic sensors, and/or additional sensors as appropriate. The field of view or vision of a LIDAR, RADAR, optical camera, or other sensor may be compromised in inclement weather driving conditions by condensation, precipitation, or debris on the lens of the sensor. The field of vision of the sensor may also be compromised due to damage to the lens of the sensor. Sensor cleaning methods and systems discussed herein are used to mitigate issues related to compromised fields of view by cleaning and analyzing the sensors' fields of view. In some embodiments, a cleaning system includes an articulating sensor-protecting lens, an integrated and replaceable wiper, and a control system configured to detect and categorize permanent or temporary irregularities in the lens surface, allowing the system to rotate the lens to avoid any permanently damaged area and determine if lens replacement is needed.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communication system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

The controller 22 also includes a sensor evaluation and cleaning control system 25 for automatically detecting and analyzing irregularities in the lens of the sensor 26. In an exemplary embodiment, the control system 25 is configured to determine whether an irregularity on an articulating sensor lens is permanent or temporary and move or rotate the sensor lens to improve the field of view of the sensor 26 via one or more actuators 30 in response to input received from one or more of the sensors 26. As discussed herein, the sensors 26 include RADAR, LIDAR, optical cameras, and/or additional sensors for which a clear field of view improves the function of the sensor.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over a wireless carrier system using one or more cellular communications protocols.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communication system 28 of the vehicle 12 with a number of different system functions and generally includes one or more databases, live advisors, as well as an automated voice response system (VRS). These various remote access center components are preferably coupled to one another via a wired or wireless local area network. The databases can store account information such as subscriber authentication information, vehicle identifiers, profile records, behavioral patterns, sensor status data, and other pertinent subscriber information. Data transmissions may also be conducted by wireless systems, such as 802.11x, GPRS, and the like. The remote access center 78 can utilize the VRS as an automated advisor, or a combination of the VRS and the live advisor can be used.

It should be understood that the disclosed methods can be used with any number of different systems and is not specifically limited to the operating environment shown here. The architecture, construction, setup, and operation of the system 10 and its individual components is generally known. Other systems not shown here and known to those skilled in the art could employ the disclosed methods as well.

Figure 2:
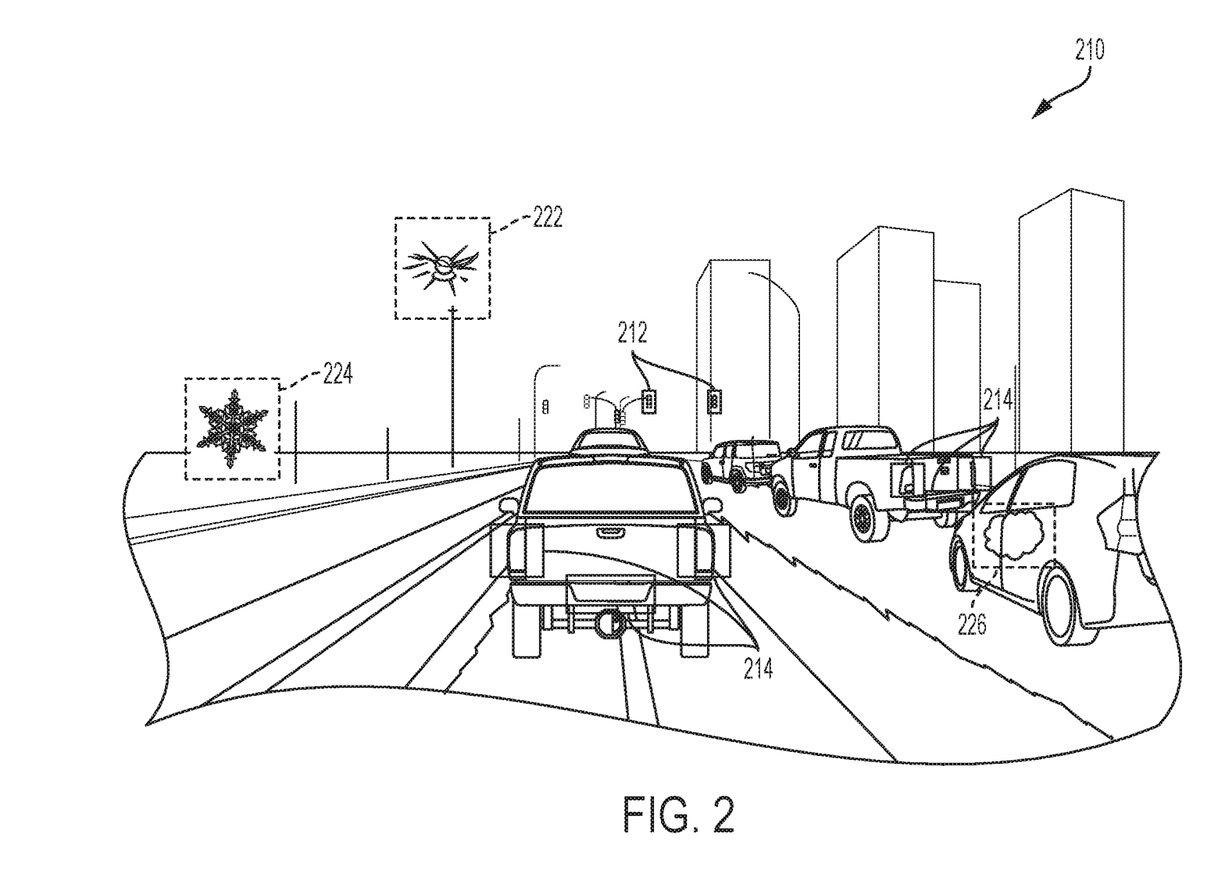
FIG. 2 is a schematic diagram of a view from a sensor illustrating several impairments on the sensor lens, according to an embodiment.

FIG. 2 shows a street scene 210 as viewed by one or more of the sensors 26 of the vehicle 12. The scene includes traffic in front of and surrounding the vehicle 12. The sensors 26, along with the controller 22 and the ADS 24, capture and identify features of the surrounding environment including traffic signals 212 and vehicle features 214, for example and without limitation. Over time, at least a portion of the field of view of one or more of the sensors 26 may become impaired due to a flaw or impairment 222 in the lens or a screen covering the lens caused by, for example and without limitation, a rock chip or other impact. Other impairments that impair at least a portion of a field of view of one or more of the sensors 26 include precipitation or debris 224, which can include contaminants such as, for example and without limitation, rain, dust, road debris, road spray, snow, ice, insects, salt spray, etc. Additionally, fogging or condensation 226 may also impair all or a portion of the lens of one or more of the sensors 26. Some of the impairments 222, 224, 226 are temporary and may be cleaned or removed (such as the debris 224 and the condensation 226) while other impairments are permanent (such as the flaw 222).

While not within the scope of this disclosure, the ADS 24 can identify and classify environmental features such as the traffic signals 212 and the vehicle features 214 and use the identified features to help guide and control the vehicle 12 during autonomous or semi-autonomous operation. However, the impairments 222, 224, 226 may introduce noise or other disruptions that can prevent the sensors 26 from accurately viewing the surrounding environment.

As discussed herein, equipping one or more sensors 26 with a movable outer lens and an integrated wiper can reduce or prevent impairments, such as the impairments 222, 224, 226, from impeding the field of view of one or more of the sensors 26. In some embodiments, the control system 25 monitors the data received from one or more of the sensors 26, determines if there is an impairment in the sensor data, classifies the impaired data as a result of a permanent or temporary impairment, and, depending on the impairment classification, either commands the actuator 30 to rotate the lens of the sensor 26 for an unimpaired field of view, ignores negligible impairments, and/or sets a fault indicating a sensor field of view impairment and notifies the user and/or the remote access center 78. Additionally, in some embodiments, the control system 25 monitors the data received from one or more of the sensors 26 to determine if the sensor lens should be replaced or have maintenance performed. For example and without limitation, in some embodiments, the control system 25 can communicate wirelessly with the remote access center 78 when data indicates that the sensor lens should be replaced and the vehicle 12 can be directed to a service facility.

Figure 3A:
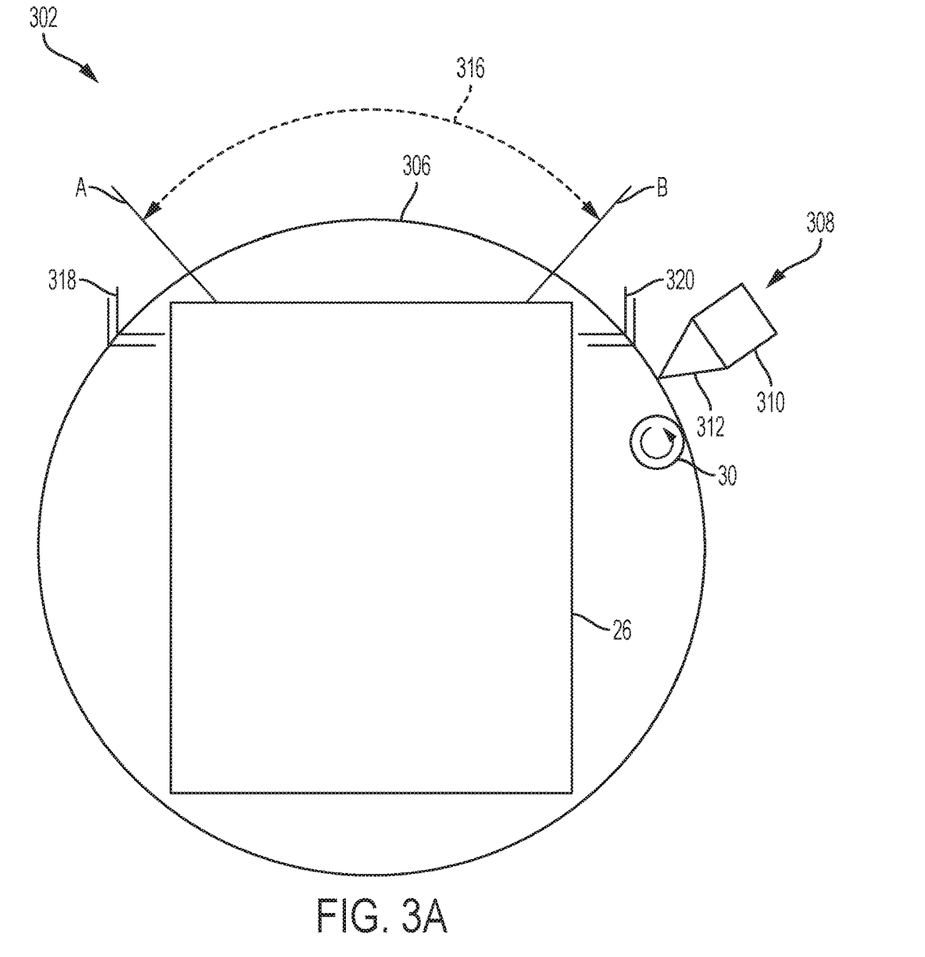
FIG. 3A is a schematic diagram of a top view of a sensor having an articulating sensor lens, according to an embodiment.
Figure 3B:
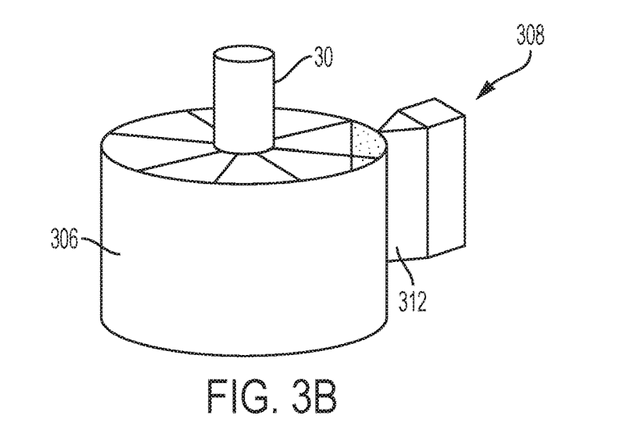
FIG. 3B is a schematic diagram of a side perspective view of the sensor and lens of FIG. 3A.

In some embodiments, after one or more impairments, such as the impairments 222, 224, 226 are identified, the control system 25 receives and stores identification information regarding the impairment 222, 224, 226 including, for example and without limitation, information on the location of the impairment 222, 224, 226 on the sensor lens and the classification of the impairment 222, 224, 226. If the impairment 222, 224, 226 is classified as an impairment that cannot be removed via cleaning or ignored if within the sensor's field of view, the control system 25 can control the position of the sensor such that the impairment 222, 224, 226 is not within the field of view of the sensor, as discussed in greater detail herein, FIG. 3A illustrates a top view of a sensor cleaning system 302, according to an embodiment. The sensor cleaning system 302 includes a movable, rotatable lens 306 and a lens cleaner 308. The lens 306 encircles the sensor 26, which is, in some embodiments, a LIDAR, RADAR, or optical sensor. As shown in FIG. 3A, in some embodiments, the lens 306 completely encircles the sensor 26. The lens cleaner 308 includes a cleaner body 310 and a tip 312. In some embodiments, the cleaner body 310 includes a reservoir for a cleaning solution. In some embodiments, the tip 312 is replaceable. In some embodiments, cleaning solution is integrated into the tip 312. In some embodiments, the tip 312 extends along at least a portion of the outer surface of the lens 306 from a first or top end of the lens 306 to a bottom or opposite end of the sensor lens 306, as shown in FIG. 3B.

In some embodiments, as shown in FIG. 3A, the lens 306 is rotatable about the sensor 26, that is, the lens 306 rotates about an axis passing vertically through the sensor 26. In some embodiments, an actuator 30 acts on the lens 306 to rotate the lens 306 to a new position such that a field of view 316 of the sensor 26 (defined as the lens area between points A and B) is clean and/or free of impairments such as the impairments 222, 224, 226. In some embodiments, the actuator 30 is a high speed rack and pinion drive system. In some embodiments, the actuator 30 is a rotational cylinder that rotates in a first direction such that the lens 306 rotates in a second and opposite direction. The lens 306 rotates in either a counterclockwise 318 or clockwise 320 direction to move the field of view 316 to a new section of the lens 306.

In some embodiments, the lens cleaner 308 receives a signal from the controller 22 to clean the lens 306, releasing fluid from the body 310 to the tip 312. In some embodiments, the actuator 30 receives a signal from the controller 22 to rotate the lens 306 in either a clockwise or counterclockwise direction. As the lens 306 rotates, the pressure of the tip 312 against the lens 306 removes debris or residue from the surface of the lens 306.

Figure 4:
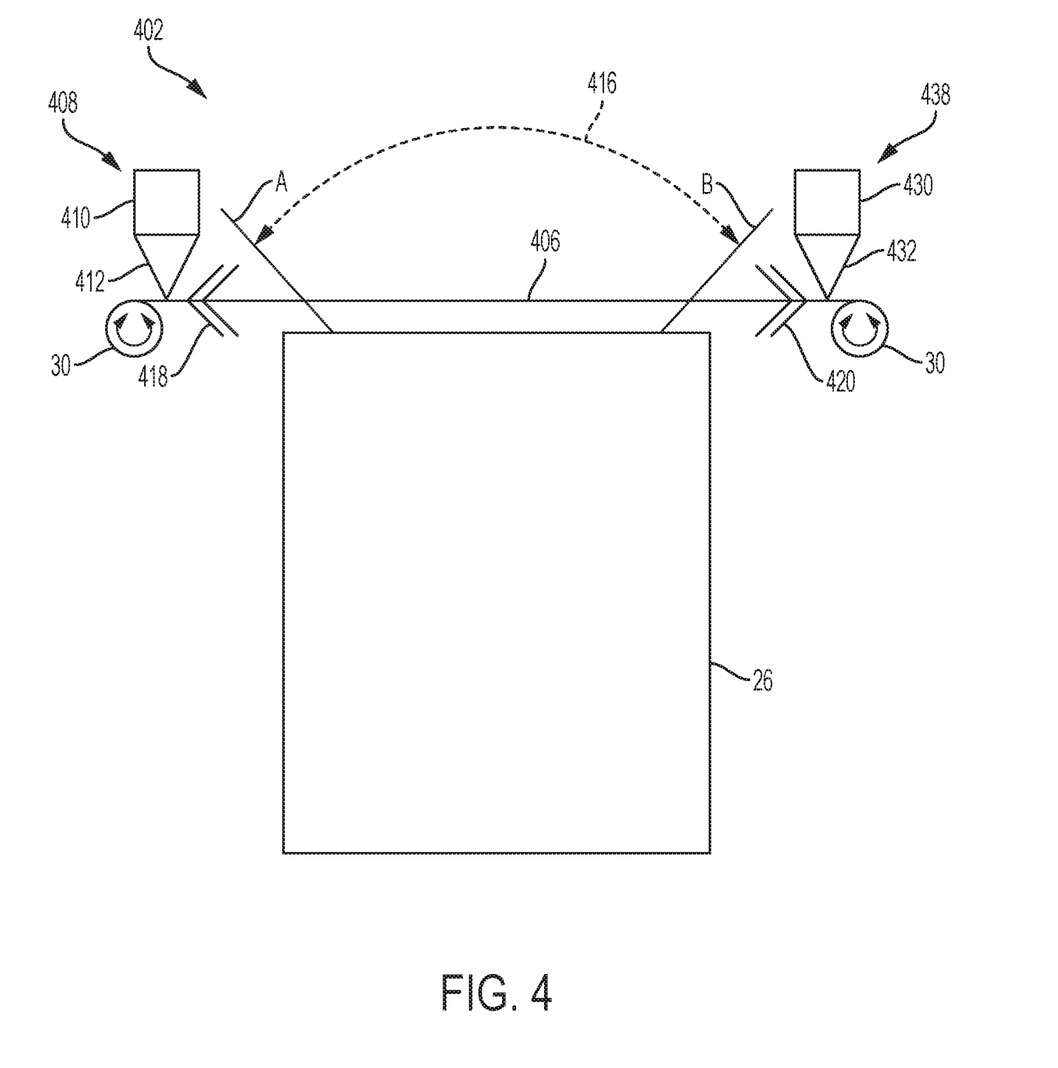
FIG. 4 is a schematic diagram of a top view of a sensor having an articulating sensor lens, according to another embodiment.

FIG. 4 illustrates a top view of a cleaning system 402, according to another embodiment. The sensor cleaning system 402 includes a movable lens 406 and lens cleaners 408, 438. The lens 406 extends across at least a portion of a field of view of a LIDAR, RADAR, or optical sensor 26. The lens cleaner 408 includes a cleaner body 410 and a tip 412 and the lens cleaner 438 includes a cleaner body 430 and a tip 432. In some embodiments, the cleaner bodies 410, 430 each include a reservoir for a cleaning solution. In some embodiments, the tips 412, 432 are replaceable. In some embodiments, cleaning solution is integrated into the tips 412, 432.

In some embodiments, as shown in FIG. 4, the lens 406 translates in front of a viewing portion of the sensor 26, that is, the lens 406 moves right to left (as indicated by arrow 418) and/or left to right (as indicated by arrow 420) in front of the sensor 26. In some embodiments, one or more actuators 30 act on the lens 406 to move or translate the lens 406 to a new position such that a field of view 416 of the sensor 26 (defined as the lens area between points A and B) is clean and/or free of impairments such as the impairments 222, 224, 226. In some embodiments, the actuators 30 are high speed rack and pinion drive systems. In some embodiments, the actuators 30 are rotational cylinders that rotate in a first direction such that the lens 406 moves from left to right and rotate in a second direction such that the lens 406 moves from right to left.

Similar to the cleaning system 302 discussed herein, in some embodiments, the lens cleaners 408, 438 receive a signal from the controller 22 to clean the lens 406, releasing fluid from the bodies 410, 430 to the tips 412, 432. In some embodiments, one or more of the actuators 30 receives a signal from the controller 22 to translate the lens 406 in either a left to right direction 420 or right to left direction 418. As the lens 406 translates, the pressure of the tips 412, 432 against the lens 406 removes debris or residue from the surface of the lens 406. Similar to the cleaning system 302 shown in FIG. 3B, in some embodiments, the tips 412, 432 extend along at least a portion of the outer surface of the lens 406 from top to bottom.

Figure 5:
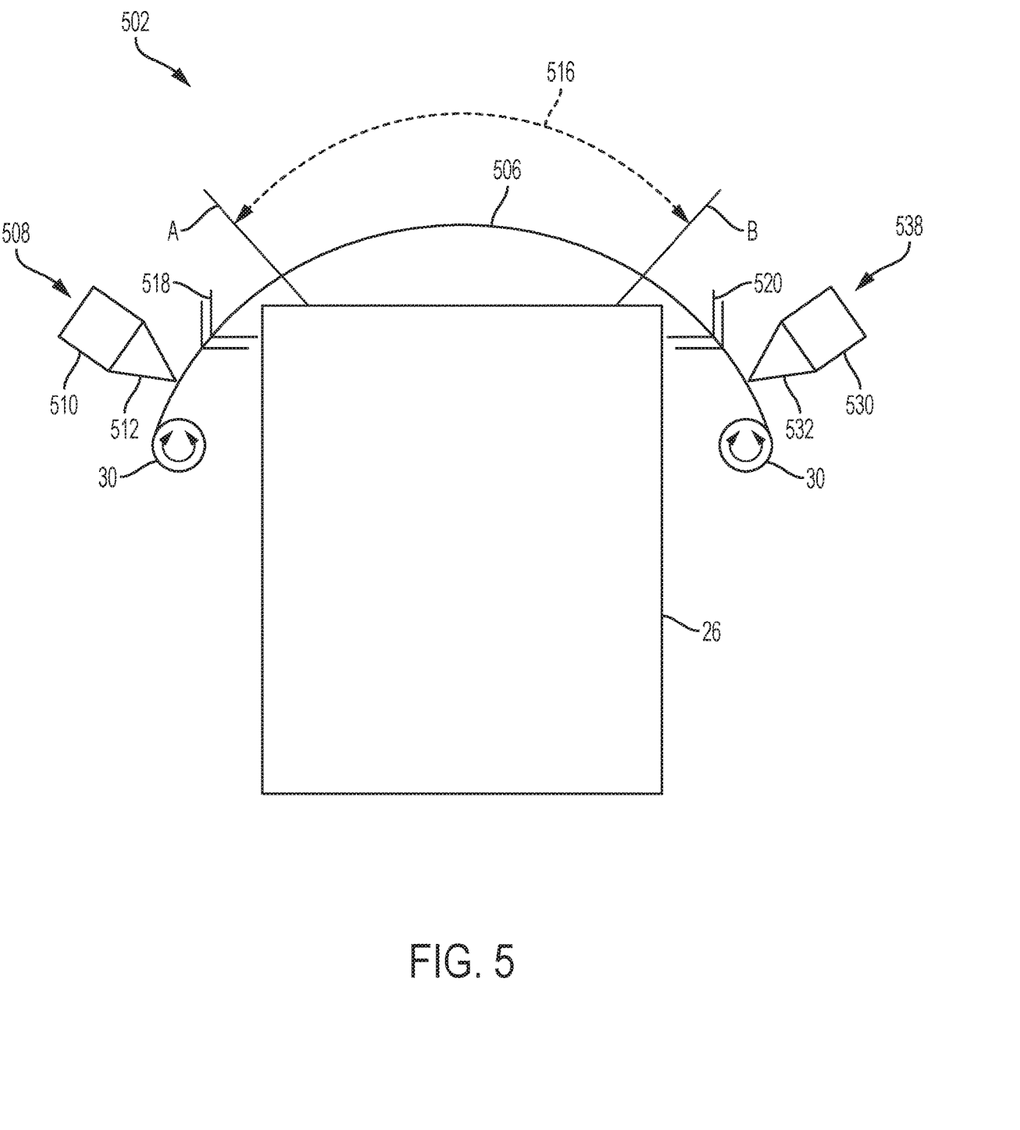
FIG. 5 is a schematic diagram of a top view of a sensor having an articulating sensor lens, according to another embodiment.

FIG. 5 illustrates a top view of a cleaning system 502, according to another embodiment. The sensor cleaning system 502 includes a movable lens 506 and lens cleaners 508, 538. The lens 506 extends across at least a portion of a field of view of a LIDAR, RADAR, or optical sensor 26. The lens cleaner 508 includes a cleaner body 510 and a tip 512 and the lens cleaner 538 includes a cleaner body 530 and a tip 532. In some embodiments, the cleaner bodies 510, 530 include a reservoir for a cleaning solution. In some embodiments, the tips 512, 532 are replaceable. In some embodiments, cleaning solution is integrated into the tips 512, 532.

In some embodiments, as shown in FIG. 5, the lens 506 rotates in front of a viewing portion of the sensor 26, that is, the lens 506 rotates about a vertical axis of the sensor 26. In some embodiments, the lens 506 encircles a portion of the sensor 26. In some embodiments, one or more actuators 30 act on the lens 506 to rotate the lens 506 to a new position such that a field of view 516 of the sensor 26 (defined as the lens area between points A and B) is clean and/or free of impairments such as the impairments 222, 224, 226. In some embodiments, the actuators 30 are high speed rack and pinion drive systems. In some embodiments, the actuators 30 are rotational cylinders that rotate in a first direction such that the lens 506 rotates counterclockwise (as shown by arrow 518) and in a second direction such that the lens 406 rotates clockwise (as shown by arrow 520).

Similar to the cleaning systems 302, 402 discussed herein, in some embodiments, the lens cleaners 508, 538 receive a signal from the controller 22 to clean the lens 506, releasing fluid from the bodies 510, 530 to the tips 512, 532. In some embodiments, one or more of the actuators 30 receives a signal from the controller 22 to rotate the lens 406 in either a clockwise 520 or counter clockwise direction 518. As the lens 506 rotates, the pressure of the tips 512, 532 against the lens 506 removes debris or residue from the surface of the lens 506. Similar to the cleaning system 302 shown in FIG. 3B, in some embodiments, the tips 512, 532 extend along at least a portion of the outer surface of the lens 506 from top to bottom.

Figure 6:
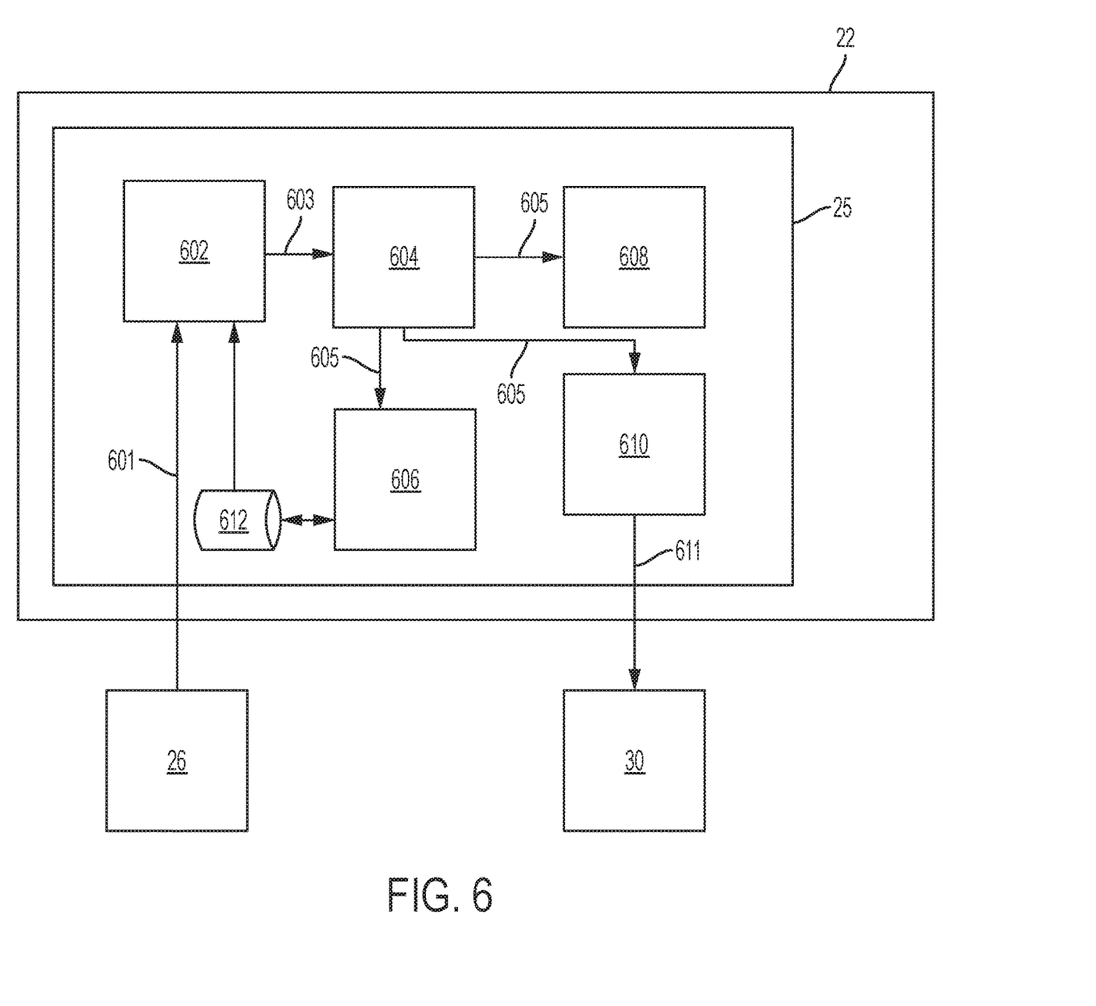
FIG. 6 is a schematic block diagram of a control system for a vehicle having a sensor with an articulating lens, according to an embodiment.

FIG. 6 is a block diagram of a controller 22 including the sensor evaluation and cleaning control system 25 for automatically detecting, monitoring, and analyzing irregularities in the lenses of the sensor 26, such as, for example and without limitation, the lenses 306, 406, and 506. The control system 25 includes a monitoring module 602 that receives data 601 from one or more vehicle sensors 26. The sensor data 601 includes, in some embodiments, data regarding the field of view of the sensor 26, such as the field of view 316, 416, or 516. The data 601 includes, in some embodiments, data regarding impairments, such as impairments 222, 224, 226, on the lens 306, 406, 506, including data regarding the location of the impairment on the sensor lens. The monitoring module 602 receives the sensor data 601 and determines whether the lens 306, 406, 506 has a defect, such as one or more of the impairments 222, 224, 226, that is impairing the field of view of the sensor 26. The monitoring module 602 also receives sensor lens defect data from a defect database 612 to determine whether the defect or impairment 222, 224, 226 is recognized in the defect database 612 that is stored, in some embodiments, in the controller 22.

The monitoring module 602 analyzes the sensor data 601 and generates analyzed data 603 that is received by a classification and evaluation module 604. The classification and evaluation module 604 analyzes the data 603 and classifies any determined defects as removable debris, ignorable debris, serviceable damage, or ignorable damage to the lens 306, 406, 506. The classification and evaluation module 604 also determines whether the classified defect can be removed by lens cleaning via rotation of the lens 306, 406, 506 or if the classified defect is damage that should be addressed through service or replacement.

The classification and evaluation module 604 generates classified data 605 that is transmitted to one or more modules of the control system 25. In some embodiments, the classified data 605 is received by a recordation module 606. The recordation module 606 analyzes the classified data 605 and, based on the defect classification, records or stores the defect data in the defect database 612. Once recorded in the defect database 612, the defect data is used by the monitoring module 602 to determine whether the defect is a known defect on the lens 306, 406, 506 or a new defect. Additionally, the defect data is used to determine whether the lens 306, 406, 506 should be rotated to a new position to avoid the defect or if the lens 306, 406, 506 should be cleaned. In some embodiments, the defect data includes the location of the impairment on the sensor lens.

In some embodiments, the classified data 605 is received by a notification module 608. The notification module 608 receives the classified data 605 and determines, based on the defect classification, whether to notify the operator or the remote access center 78 of a defect that cannot be cleaned or ignored via a notification signal transmitted by, in some embodiments, the wireless communication system. The notification signal includes, in some embodiments, instructions to the operator or the remote access center 78 that one or more of the sensors 26 should be serviced.

In some embodiments, a control module 610 receives the classified data 605. The control module 610 receives the classified data 605 and generates, based on the defect classification, a control signal 611. The control module 610 transmits the control signal 611 to one or more actuators 30 to rotate or translate the lens 306, 406, 506 to a new position until the defect or damage is out of the field of view of the sensor 26 or has been cleaned from the field of view. In some embodiments, if a sensor defect cannot be cleaned or ignored, the control module 610 transmits a control signal to the ADS 24 of the controller 22 as an instruction to operate the vehicle 12 in a "limp home" mode or non-autonomous mode.

Figure 7:
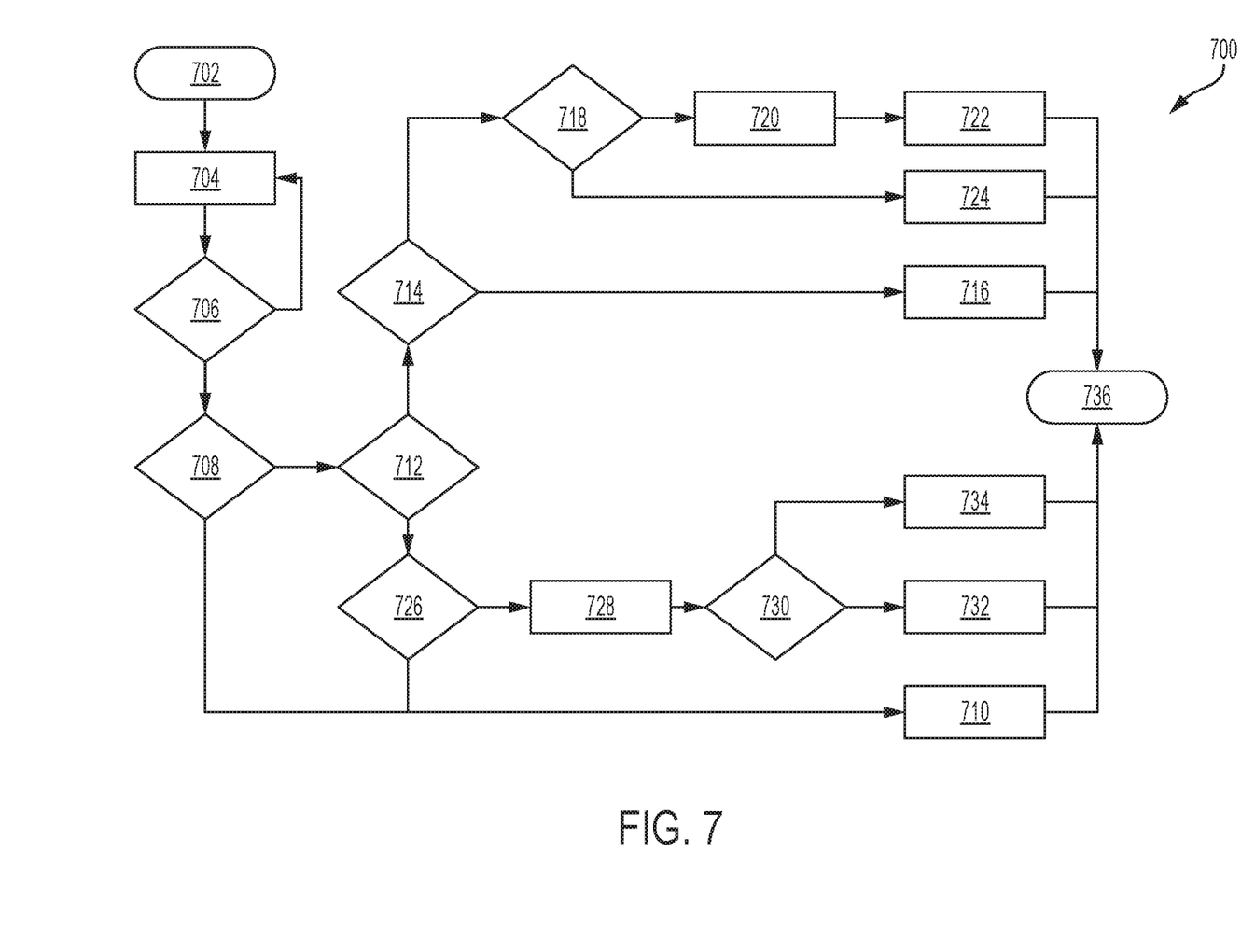
FIG. 7 is a flow diagram of a method of detecting and correcting for irregularities in a sensor lens, according to an embodiment.

FIG. 7 is a flow chart of an algorithm or method 700 to monitor and evaluate a sensor lens, such as the sensor lenses 306, 406, 506. The method 700 can be utilized in connection with a vehicle having one or more sensors, such as the vehicle 12 having one or more sensors 26. The method 700 can be utilized in connection with the controller 22 and the various modules of the sensor evaluation and cleaning control system 25, in accordance with exemplary embodiments. The order of operation of the method 700 is not limited to the sequential execution as illustrated in FIG. 7 but may be performed in one or more varying orders, or steps may be performed simultaneously, as applicable and in accordance with the present disclosure.

As shown in FIG. 7, starting at 702, the method 700 proceeds to 704. At 704, the monitoring module 602 receives sensor data from one or more of the sensors 26. In some embodiments, the monitoring module 602 is monitoring sensor data received from one or more cameras or LIDAR sensors of the vehicle 12. As discussed herein, the monitoring module 602 monitors the sensor data for impairments, such as the impairments 222, 224, 226, that might obstruct the field of view of the sensor 26.

From 704, the method 700 proceeds to 706. At 706, the monitoring module 602 determines whether the lens 306, 406, 506 has a defect, such as one or more of the impairments 222, 224, 226, that is impairing the field of view of the sensor 26. If the lens 306, 406, 506 does not have a defect, such as debris or damage, the method 700 returns to 704 for continued monitoring of the lens 306, 406, 506.

If the lens 306, 406, 506 has a defect, the method 700 proceeds to 708. At 708, the monitoring module 602 determines if the defect or impairment 222, 224, 226 identified from the sensor data is recognized from data stored in the defect database, such as the database 612.

If the defect is not recognized through the defect database, the method 700 proceeds to 710. At 710, a fault is set for the sensor 26 identified as having the defect or impairment 222, 224, 226. In some embodiments, the fault is set by the controller 22. In some embodiments, notification of the sensor fault is transmitted to the operator and/or a remote location, such as the remote access center 78, via the notification module 608 and the wireless communication system 28. From 710, the method 700 proceeds to 736 and ends.

If the defect or impairment is recognized from the defect database, the method 700 proceeds to 712. At 712, the data from the monitoring module 602 is analyzed by the classification and evaluation module 604. The classification and evaluation module 604 analyzes the sensor data to determine if the impairment is due to removable debris on or damage to the lens 306, 406, 506.

If the defect or impairment is classified as debris, the method 700 proceeds to 714. At 714, the classification and evaluation module 604 determines whether the debris can be removed by lens cleaning via rotation of the lens 306, 406, 506 such that at least a portion of the lens 306, 406, 506 is cleaned by one or more lens cleaners, such as the lens cleaners 308, 408, 438, 508, 538. If the debris can be removed by cleaning the lens, the method 700 proceeds to 716. At 716, the control module 610 receives the data regarding the removable debris and generates a control signal that is transmitted to the one or more actuators 30 to rotate or translate the lens 306, 406, 506 to a new position until the debris is removed from the field of view of the sensor 26. From 716, the method 700 proceeds to 736 and ends.

If the debris cannot be removed by cleaning the lens via rotation or translation, the method 700 proceeds to 718. At 718, the classification and evaluation module 604 determines whether the debris on the lens 306, 406, 506 can be ignored. If the debris can be ignored, the method 700 proceeds to 720. At 720, the recordation module 606 stores the lens debris location. The lens debris location data may be stored in any storage location of the controller 22, such as, for example and without limitation, the defect database 612. The method 700 then proceeds to 722. At 722, sensor data obtained from the damaged region of the lens 306, 406, 506 is voided or ignored by the various modules of the controller 22, including, in some embodiments, the ADS 24, since the sensor data could be obscured or incomplete. From 722, the method 700 proceeds to 736 and ends.

If the debris cannot be ignored, the method 700 proceeds from 718 to 724. At 724, a fault is set for the sensor 26 identified as having the defect or impairment 222, 224, 226. In some embodiments, the fault is set by the controller 22. In some embodiments, notification of the sensor fault is transmitted to the operator and/or a remote location, such as the remote access center 78, via the notification module 608 and the wireless communication system 28. In some embodiments, the notification of the sensor fault received by the remote access center 78 triggers a maintenance event for the vehicle 12 and the vehicle 12 is directed to proceed to a service facility. From 724, the method 700 proceeds to 736 and ends.

If, at 712, the defect or impairment 222, 224, 226 is classified as damage, the method 700 proceeds to 726. At 726, the classified data is evaluated by the classification and evaluation module 604 to determine if the damage could be reduced or mitigated by servicing the lens 306, 406, 506. For example and without limitation, if the damage is a hole or large crack in the lens 306, 406, 506, sensor performance could be improved through service of the lens. If the damage could be improved or removed by servicing the lens 306, 406, 506, the method 700 proceeds to 710. At 710, as discussed herein, a fault is set for the sensor 26 identified as having the defect or impairment 222, 224, 226. In some embodiments, the fault is set by the controller 22. In some embodiments, notification of the sensor fault is transmitted to the operator and/or a remote location, such as the remote access center 78, via the notification module 608 and the wireless communication system 28. In some embodiments, the notification includes a suggestion or instruction to the operator or the remote access center 78 that the vehicle 12 should be serviced with respect to the damaged sensor lens 306, 406, 506. From 710, the method 700 proceeds to 736 and ends.

If the damage does not require service, the method 700 proceeds from 726 to 728. At 728, the recordation module 606 stores the lens debris location. The lens damage location data may be stored in any storage location of the controller 22, such as, for example and without limitation, the defect database 612.

Next, the method 700 proceeds to 730. At 730, the classification and evaluation module 604 determines whether the damage can be rotated out of the field of view of the sensor 26. If the damage can be rotated out of the field of view, the method 700 proceeds to 732. At 732, the control module 610 receives the data regarding the damage to the lens 306, 406, 506, including the location of the damage on the lens, and generates a control signal that is transmitted to the one or more actuators 30 to rotate or translate the lens 306, 406, 506 to a new position until the damage is removed from the field of view of the sensor 26. From 732, the method 700 proceeds to 736 and ends.

If the damage cannot be rotated out of the field of view of the sensor 26, the method 700 proceeds to 734. At 734, sensor data obtained from the damaged region of the lens 306, 406, 506 is voided or ignored by the various modules of the controller 22, including, in some embodiments, the ADS 24, since the sensor data could be obscured or incomplete. From 734, the method 700 proceeds to 736 and ends.

In some embodiments, the method 700 runs continuously to monitor the status of the sensor lens.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. Is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5" "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method to monitor and evaluate irregularities on a sensor lens of at least one sensor of a vehicle, the method comprising:
providing the vehicle with an actuator configured to move the sensor lens and a controller in electronic communication with the actuator;
receiving, by the controller, sensor data corresponding to at least one characteristic of a vehicle environment from the at least one sensor;
evaluating, by the controller, the sensor data to determine if the sensor data indicates an irregularity on the sensor lens of the at least one sensor;
classifying, by the controller, the irregularity as one of removable debris, ignorable debris, serviceable damage, and permanent ignorable damage to the sensor lens;
storing, by the controller, irregularity data corresponding to a location on the sensor lens of the classified irregularity in a non-transient, computer-readable data medium; and
in response to the classified irregularity being classified as permanent ignorable damage to the sensor lens, automatically controlling, by the controller, the actuator to move the sensor lens from a first position in which the permanent ignorable damage to the sensor lens appears in a field of view of the sensor to a second position in which the permanent ignorable damage to the sensor lens does not appear in the field of view of the sensor.

2. The method of claim 1, further comprising, in response to classifying the irregularity as ignorable debris, removing, from the non-transient, computer readable medium, stored sensor data obtained when the sensor lens was in the first position, wherein in the first position a field of view of the sensor lens is at least partially obscured by the irregularity.

3. The method of claim 1, further comprising:
providing the vehicle with a cleaning system comprising a lens cleaner configured to clean at least a portion of an outside surface of the sensor lens; and
in response to classifying the irregularity as removable debris, automatically controlling, by the controller, the actuator to move the sensor lens from a first position to a second position wherein the lens cleaner moves across at least a portion of the outside surface of the sensor lens to remove the debris from the sensor lens.

4. The method of claim 1, further comprising:
providing the vehicle with a wireless communication system; and
in response to classifying the irregularity as serviceable damage, generating, by the controller, a notification signal and transmitting via the wireless communication system, the notification signal to a remote access center;
wherein the notification signal is a service notification for the at least one sensor.

5. The method of claim 1, wherein storing the irregularity data comprises storing a location of the irregularity on the sensor lens.

* * * * *